United States Patent [19]

Sun et al.

[11] Patent Number: 5,079,316

[45] Date of Patent: * Jan. 7, 1992

[54] GRAFT COPOLYMERS OF POLYMERIZABLE MONOMERS AND OLEFIN/CARBON MONOXIDE COPOLYMERS

[75] Inventors: Yun C. Sun, Midland, Mich.; Gerry M. Lancaster, Surfside, Tex.

[73] Assignee: The Dow Chemical Company, Midland, Mich.

[*] Notice: The portion of the term of this patent subsequent to May 29, 2007 has been disclaimed.

[21] Appl. No.: 483,490

[22] Filed: Feb. 22, 1990

[51] Int. Cl.⁵ .................... C08F 283/00; C08L 51/08
[52] U.S. Cl. ........................................ 525/539; 525/63
[58] Field of Search ................................. 525/539, 63

[56] References Cited

U.S. PATENT DOCUMENTS

| | | |
|---|---|---|
| 4,536,545 | 4/1985 | Olener et al. . |
| 4,600,614 | 7/1986 | Lancaster et al. ................. 428/511 |
| 4,762,890 | 8/1988 | Strait et al. ......................... 525/285 |
| 4,894,423 | 2/1990 | Harah et al. . |
| 4,929,672 | 5/1990 | Laughner ............................... 525/92 |
| 4,929,673 | 5/1990 | Laughner et al. ..................... 525/92 |

*Primary Examiner*—Ana L. Carrillo
*Assistant Examiner*—Thomas Hamilton, III

[57] ABSTRACT

Graft copolymers of polymerizable monomers and olefin/carbon monoxide copolymers are uniquely suitable as compatibilizing agents in the preparation of polyester or polycarbonate containing resin blends.

6 Claims, No Drawings

GRAFT COPOLYMERS OF POLYMERIZABLE MONOMERS AND OLEFIN/CARBON MONOXIDE COPOLYMERS

BACKGROUND OF THE INVENTION

The present invention relates to graft copolymers formed by the polymerization of polymerizable monomers in the presence of an olefin/carbon monoxide copolymer. More particularly the present invention relates to such graft copolymers formed by polymerization of an alkenyl aromatic monomer or alkyl methacrylate monomer in the presence of an ethylene carbon monoxide copolymer.

In U.S. Pat. No. 4,536,545 there are disclosed certain graft copolymers prepared by reacting an ethylenically unsaturated polymerizable monomer with a polymer of an olefin of 2 to about 8 carbon atoms. In the process the olefin polymer is substantially insoluble in the monomer but is capable of absorbing the monomer. At column 6, lines 62-65, it is stated that various other polyolefins that contain other than hydrogen and carbon can also be employed in the process as long as they meet the criteria of being insoluble in the reactive monomer and capable of absorbing that monomer. Specific examples include polymers of substituted hydrocarbon olefins such as vinyl acetate, vinyl benzoate, and other vinyl esters with organic acids and halo acids, isopropenyl acetate and other esters, methylmethacrylate and other alkyl methacrylates, methylacrylate, ethylacrylate and other alkyl acrylate.

Recently it has been discovered that grafted polyethylene copolymers corresponding to those disclosed in the aforementioned U.S. Pat. No. 4,536,545 possess properties making them suitable for use in preparing compatibilized blends of polycarbonates, or polyesters with other polymers such as ABS, and mixtures of polycarbonate and polyester resins. However, it would be desirable if improved compatibility in the above polycarbonate blends were attained, in as much as such blends are still found to lack in sufficient physical properties due to a deficiency in the polymer compatibilization abilities of such grafted copolymers.

Accordingly there exists in the art a desire for improved compatibilizing agents useful in the preparation of blends of polycarbonate with other thermoplastic resins, in particular blends of polycarbonates with styrene acrylonitrile copolymers and rubber modified derivatives thereof, particularly ABS resins.

SUMMARY OF THE INVENTION

According to the present invention there is provided a grafted olefin/carbon monoxide copolymer comprising a substrate phase of a copolymer of a $C_{2-8}$ olefin and carbon monoxide containing from 0.1 to 40 percent by weight carbon monoxide having grafted thereto a graft polymer phase comprising one or more vinyl or vinylidene monomers, the weight ratio of substrate to graft polymer phase being from 0.1/100 to 100/0.1.

DETAILED DESCRIPTION OF THE INVENTION

The preferred olefin copolymer utilized according to the present invention is a copolymer of ethylene and carbon monoxide ("ECO") ECO may be formed by polymerizing ethylene and carbon monoxide in the desired proportions in a pressure vessel using a peroxy catalyst or a metallic or palladium compound as the catalyst. A hydrocarbon liquid which is non-reactive under the polymerization conditions may be used as a diluent and reaction medium, although any medium which acts as a solvent for the catalyst system and in which the catalyst is stable is suitable for use. Air and water are preferably excluded from the reaction chamber The polymerization can be performed at temperatures in the range from as low as 10° C. up to 200° C., but is preferably run in the range of 50° C. to 140° C. Pressures as high as 3,000 atmospheres (303 MPa) may be employed in the reaction, but the usual pressure of operation is in the range of 20 atmospheres (2.02 MPa) to about 1,500 atmospheres (151.5 MPa). Both yield and molecular weight increase with increasing pressure. Alternatively, an olefin/carbon monoxide copolymer can be made without solvent under high pressure conditions, using a free radical initiator in a stirred autoclave.

A variety of $C_{2-8}$ olefin monomers in place of ethylene, and numerous vinyl monomers in addition to ethylene, can be used to form the olefin copolymer substrate along with carbon monoxide Any ethylenically unsaturated compound containing the $>C=C<$ alkene bond which will undergo polymerization across the double bond can form part of the olefin/carbon monoxide ("olefin/CO") copolymer, although olefin monomers such as propylene, isobutylene and 1-butene, and vinyl monomers such as butadiene, allyl esters, vinyl acetate, vinyl chloride, vinyl aromatics such as styrene, alkyl acrylates such as ethyl acrylate, acrylonitrile, tetrafluoroethylene and other vinyl monomers and other substituted and unsubstituted $C_{2-8}$ alpha alkenes and mixtures of the foregoing, are preferred. Copolymers comprising a $C_{2-8}$ olefin and carbon monoxide and methods for the preparation thereof, are discussed in greater detail in U.S. Pat. Nos 4,600,614, 2,495,286, 3,083,184, 3,530,109 and 3,694,412, the teachings of which are incorporated in their entirety by reference thereto.

Preferred copolymers for use according to the present invention comprise from 0.5 to 10 weight percent carbon monoxide. Grafting of the polymerizable monomer to the olefin/CO copolymer substrate is occasioned by polymerizing one or more vinyl or vinylidene monomers in the presence of the preformed olefin/carbon monoxide copolymer under free radical polymerization conditions. Suitable reaction conditions and equipment are generally those disclosed in the aforementioned U.S. Pat. No. 4,536,545.

Preferred vinyl or vinylidene monomers are methyl acrylate, methyl methacrylate, maleic anhydride, glycidyl methacrylate, vinyl acetate, alkenyl aromatic hydrocarbons such as styrene, or alpha methyl styrene, vinyl cyanides such as acrylonitrile, and mixtures of the foregoing monomers. Preferred vinyl monomers are styrene, methyl methacrylate, acrylonitrile and mixtures thereof. Typically, but not necessarily, the monomer(s) of which the grafting phase is comprised is/are brought into contact with the olefin/CO copolymer substrate, and the graft polymer is formed, and grafted to the backbone, in situ. However, the grafting chain could be formed first as a polymer or (copolymer) in its own right and then grafted onto the polymeric backbone The olefin/CO copolymer substrate and grafting monomer(s) can be brought together (1) in a suspension where the substrate and/or monomers are suspended in a suitable medium and the copolymer substrate is swelled with the monomer(s) prior to the grafting: (2) in an emulsion where the substrate is dispersed in a latex polymerization of the monomer(s); (3) in a bulk or solution system where a solution of the substrate copolymer in liquid monomer and/or solvent is formed and the grafting is completed under high shearing conditions: or (4) in a solid polymerization wherein the insoluble copolymer substrate is contacted with and swollen by the monomers or a solution of the monomers (without suspension or emulsification) and polymerization is thereafter initiated. The graft polymerization can be performed in a standard reaction vessel or in the barrel of an extruder, for example either a single or twin screw vented extruder.

A variety of conditions can prevail during the graft polymerization without affecting the product's performance. However, it is preferred that the polymerization occur at a temperature from 25° to 100° C., preferably 40° to 85° C. in the presence of a free radical initiator such as an organic peroxide compound As will be appreciated by the skilled artisan, not all of the polymer formed in the free radical polymerization of the vinyl or vinylidene monomer needs to be grafted to the olefin/carbon monoxide copolymer Preferably, the percentage of grafted product resulting from the foregoing polymerization is from 0.01 to 95 percent on a weight basis, more preferably from 0.1 to 50 percent. Also preferred are grafted olefin/carbon monoxide copolymers wherein the graft to substrate ratio is 1:100 to 100:1.

Once having been prepared, the grafted olefin/carbon monoxide copolymer may be recovered and utilized as a thermoplastic molding resin in the preparation of useful articles such as films, foams, and molded articles or employed in any other suitable manner. As a particularly preferred embodiment it is highly desirable to employ the olefin/carbon monoxide graft copolymers of the present invention as compatibilizing agents in the formation of blends of normally incompatible polymers. In particular the copolymers of the present invention are highly desirable for use in the preparation of compatibilized blends comprising polycarbonates. Suitably the olefin/carbon monoxide graft copolymers are combined in a minor amount in a blend comprising aromatic polycarbonate resins, aromatic polyester resins, aromatic polyester/carbonate resins, styrene/acrylonitrile copolymer blends, and rubber modified styrene/acrylonitrile copolymer blends. A particularly suitable blend comprises polycarbonate, ABS and the olefin/carbon monoxide copolymers of the present invention. Generally from 0.1 to 50 percent by weight, more preferably from 1.0 to 10 percent by weight of the grafted olefin/carbon monoxide compatibilizer is employed in the blend.

Suitable blends comprising the olefin/carbon monoxide copolymers and polycarbonate resins are further disclosed and claimed in copending U.S. application Ser. Nos. 347,838, 347,846, and 347,847, all filed on May 4, 1989 and assigned to the same assignee as the present copending application. For the teachings contained therein the aforementioned pending U.S. patent applications are hereby incorporated in their entirety by reference thereto.

The following examples are meant to be illustrative only and are not intended to limit, in any manner, the scope of the invention as set forth in the claims. Unless stated to the contrary all parts and percentages are based on weight.

EXAMPLE 1

Into a ten gallon stirred polymerization reactor is loaded 1200 grams of a ethylene/carbon monoxide copolymer resin containing 5 percent CO content. To the resin in the reactor is added 3,000 grams of demineralized water, 1.8 grams of tertiary butyl peroctoate, 300 grams of styrene and 1.2 grams of Methocel ® K4M brand cellulose ether as a suspending agent.

The reactor is sealed, purged with nitrogen and elevated to a temperature of about 25° C. After polymerization has begun, the temperature is raised to 80° C. and polymerization is allowed to continue for about 16 hours. The resultant polymeric material is vacuum stripped and recovered. The product is usefully employed in a 5 weight percent concentration with polycarbonate/ABS (20/80) to from a compatible blend.

EXAMPLE 2

The procedures of Example 1 are repeated excepting that 300 grams of methyl methacrylate are employed instead of styrene. The product is usefully employed in a 10 percent concentration with polyethylene terephthalate/polycarbonate (50/50) to form a compatible blend.

What is claimed is:

1. A composition comprising a grafted olefin/carbon monoxide copolymer comprising a substrate phase of a copolymer of a $C_{2-8}$ olefin and carbon monoxide containing from 0.1 to 40 percent by weight carbon monoxide having grafted thereto a graft polymer phase comprising one or more vinyl or vinylidene monomers, the weight ratio of substrate to graft polymer phase being from 0.1/100 to 100/0.1.

2. A composition according to claim 1 wherein the olefin/carbon monoxide copolymer substrate is an ethylene/carbon monoxide copolymer.

3. A composition according to claim 2 wherein the carbon monoxide content of the olefin/carbon monoxide copolymer substrate is from 0.5 to 10 weight percent.

4. A composition according to claim 1 wherein the graft to substrate ratio is from 1:100 to 100:1.

5. A composition according to claim 1 wherein the graft polymer comprises a polymer of methyl methacrylate, styrene, acrylonitrile, or mixtures thereof.

6. A composition according to claim 1 prepared by contacting the substrate copolymer with the monomers and initiating free radical polymerization of the mixture.

* * * * *